3,295,945
PROTECTIVE SALT BATH FOR A GLASS RIBBON
Emile Plumat, Gilly, Belgium, assignor to Glaverbel,
Brussels, Belgium
Filed June 29, 1966, Ser. No. 561,530
10 Claims. (Cl. 65—30)

This is a continuation-in-part application of my earlier application, Serial No. 311,320 filed Sept. 25, 1963, now abandoned.

The invention relates to protective salt baths for a glass ribbon in the plastic state.

The invention is particularly concerned with a bath comprising chlorides of alkali metals or alkaline-earth metals, and more particularly chlorides of metals which diffuse into the glass and chlorides of metals which do not diffuse into the glass.

Known baths of the kind specified are formed by sodium, barium and potassium chlorides or sodium, barium and lithium chlorides. Of these metals, only sodium is a constituent of the usual flat glass composition. Barium, does not diffuse into the glass, while potassium and lithium, may diffuse into the glass in the plastic state and become substituted for sodium ions of the glass, which then diffuse into the bath to form sodium chloride. This ionic exchange between the sodium of the glass and the potassium of the bath or between the sodium of the glass and the lithium of the bath causes deterioration of the surface of the plastic glass ribbon floating on a known bath of the kind specified.

When potassium ions diffuse into the glass and sodium ions in the glass are partly substituted by such potassium ions, at temperatures below the annealing point of the glass, the glass increases in volume in the surface layers thereof in contact with the bath, since the potassium ion is larger than the sodium ion. Consequently, after the glass ribbon has cooled, its surface layers have a high degree of compressive stress, while its central layers have a high degree of tensile stress, with the result that there is a high degree of residual stress in the cold ribbon.

On the other hand when the potassium ions diffuse into the surface layers of the glass and take the place of sodium ions at temperatures above the annealing point of the glass, they increase the coefficient of expansion of such layers but they do not cause stresses in the glass because the internal network is deformable.

On the contrary, when the ribbon is cooled below the annealing point, the coefficient of expansion of the surface layers is greater than the coefficient of expansion in the internal layers which cause tensile stress in these surface layers, while its internal layers have high compressive stress and therefore disadvantageous residual stresses appear in the cold glass ribbon.

When lithium ions diffuse into the glass, a result opposite to that of the potassium occurs. When the diffusion occurs below the annealing point of the glass, the surface layers of the glass ribbon have considerable tensile stress while the internal layers have considerable compressive stress, since the lithium ion is smaller than the sodium ion. On the contrary, when the diffusion occurs above the annealing point of the glass, there is a reduction of the coefficient of expansion of the surface layers without giving rise to stresses in the glass, but after cooling below the annealing point, the smaller coefficient of expansion of the surface layers causes compressive stress in those layers while the internal layers have tensile stress. Therefore when lithium ions diffuse into the glass, residual stresses are found in the cooled product.

It is an object of the invention to eliminate such residual stresses in the cooled glass ribbon. To this end, in a bath according to the invention, the chlorides of the metals which diffuse into the glass are both on the one hand, chlorides of metals which increase the coefficient of expansion of the glass when they diffuse into the glass with substitution and on the other hand, chlorides of metals which reduce the coefficient of expansion of the glass when they diffuse into the glass with substitution, said chlorides of metals which diffuse into the glass being respectively present in said bath in a proportion such that the diffusion into the glass of the cations of such diffusing metals and the substitution of such cations for the alkali cations which are constituents of the glass do not cause any change in the glass volume and in the coefficient of expansion of the glass.

A bath according to the invention is formed, for example, by 20 to 30% sodium chloride, 40 to 60% barium chloride, 13 to 18% potassium chloride and 7 to 13% lithium chloride. The barium chloride is chemically inert with respect to the glass and is thus desirable. But the melting point of the barium chloride is high and it is necessary to add thereto other salts, more particularly lithium and potassium chlorides, to lower the melting point of the bath while maintaining a high proportion of barium chloride.

With the above contents of potassium and lithium chlorides in the salt bath, the effect of the potassium ion diffusing into the surface layers of a ribbon of sodium glass of usual flat glass composition is compensated or balanced by the effect of the lithium ion also diffusing simultaneously into the same layers. Such counterbalancing of the opposite effects applies to both the influence of such ions on the volume of the surface layers and to the influence of said ions on the coefficient of expansion of such layers. The result of such counterbalancing is that dangerous residual stresses are substantially eliminated from the cold glass ribbon and the properties of the sodium glass remain intact.

Suitable quantitative determination of the potassium and lithium chlorides produces the following composition for a bath, more particularly a bath on which a sodium glass ribbon is to be floated or slidably advanced: barium chloride 50%, sodium chloride 25%, lithium chloride 10%, potassium chloride 15%.

The invention will now be described showing the use of the bath with reference to the apparatus in the accompanying drawings, wherein.

Figure 1:
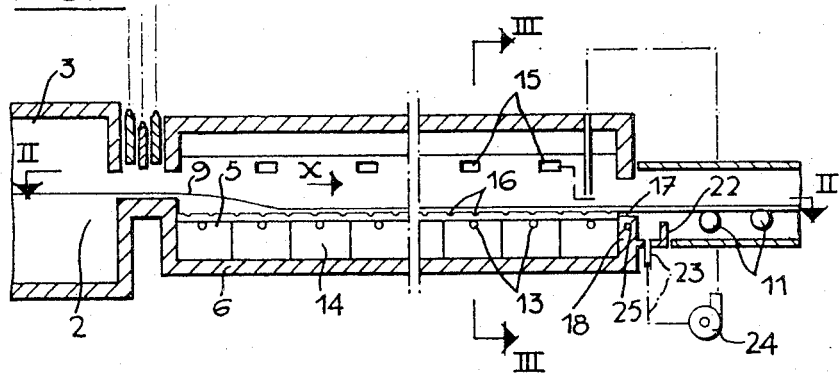
FIGURE 1 is a longitudinal section, taken along line I—I of FIGS. 2 and 3, of an embodiment employing the bath according to the invention.
Figure 2:
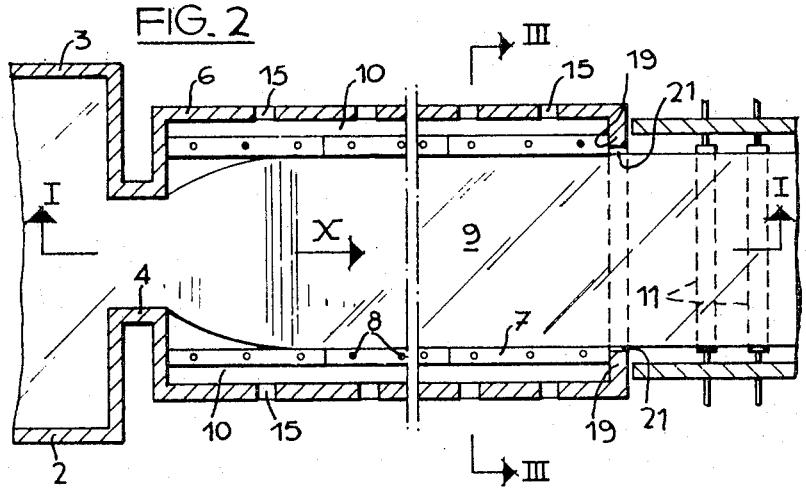
FIGURE 2 is a sectional view taken along line II—II of FIGS. 1 and 3.
Figure 3:
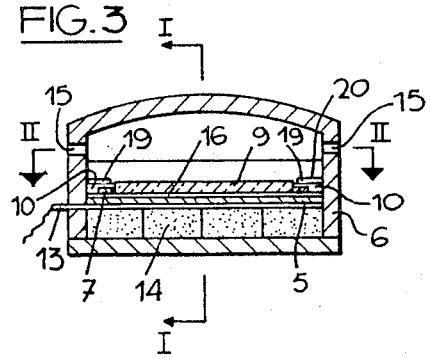
FIGURE 3 is a cross-sectional view taken along line III—III in FIGS. 1 and 2.
Figure 4:
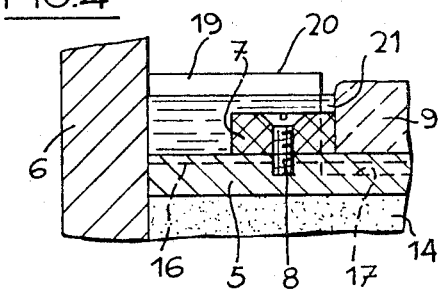
FIGURE 4 is a view to an enlarged scale of a part of FIG. 3.

In order to manufacture a fire-polished glass strip, glass 2 from a glass melting tank 3 overflows a threshold 4 and enters a tank 6. The glass spreads out on a film on a flat solid metal member 5 as will be described more fully hereinafter. The overflowing glass thins out rapidly as it moves, in the direction indicated by arrow X, parallel with the longitudinal axis of the tank 6 and it spreads out in width until it abuts carbon straight edges 7 which are parallel with the longitudinal axis of the tank 6 and which are placed at a distance from the side walls thereof. The straight edges 7 are secured to base 5 by means of screws 8, as can be seen in FIG. 4. The part of tank 6 which is near the vessel 3 is therefore the equivalent of a device for shaping a glass strip 9 which slides along in contact with the carbon straight edges 7 and the solid metal base 5.

Tank 6 contains a molten bath 10 of a substance unaffected by air at the working temperatures. This bath has the following weight composition: $BaCl_2$, 42%; NaCl, 30%; LiCl, 13%; KCl, 15%.

The melting point of this bath is 520° C. The glass which overflows over threshold 4 has the following weight composition: $SiO_2$, 71.72%; $Na_2O$, 11.40%; $K_2O$, 0.30%; CaO, 13.78%; $Al_2O_3$, 1.86%; $Fe_2O_3$, 0.26%; MgO, 0.41%; MnO, 0.27%.

The annealing point of this glass is 570° C. The glass overflows onto the film on base 5 at a temperature of about 1050° C. The solid metal base 5 is maintained at this temperature where it receives the glass. The temperature of base 5 gradually decreases towards the opposite end of the base 5 where it is maintained at about 560° C. This insures that the glass strip which leaves the base approximately at the same temperature (560° C.) is cool enough for its surface not to be damaged when it contacts conveying rollers 11 disposed in an annealing tunnel 12. The variation of the temperature of the base 5 in the direction of strip movement is achieved by electric heating resistances 13 which are disposed below the base 5 in recesses in refractory insulating blocks 14. The side walls are formed with apertures 15 adapted to receive burners for helping to maintain an appropriate temperature in the enclosed space above the glass strip. The burners can also be used to melt—in tank 6 and before treatment of the glass strip—the metal or alloy which will subsequently form the base 5, so that a solid flat metal surface is provided once the last-mentioned metal or alloy has solidified.

The solid metal base 5 is formed with transverse grooves 16 which extend not only over the whole width of the glass strip 9 and of the carbon straight edges 7 but also as far as the intervals between the straight edges 7 and the tank side walls. The bath 10 can therefore be permanently maintained in contact with the glass strip at different places along the path followed thereby in contact with the base 5. The transverse grooves 16 are shown as extending in a direction perpendicular to the direction of strip movement.

One can obtain a glass strip of 6 millimeters thickness at a speed of 230 meters/hour on a bath 10 having a length of 45 meters. The duration of the contact of the glass with the molten film on the base 5 is then approximately 12 minutes.

During this time, the glass passes from a temperature of about 1050° C. at a viscosity of approximately $10^{3.5}$ poises to about 560° C. at a viscosity of approximately $10^{13.9}$ poises. This last temperature is below the annealing point of the glass.

With the composition given hereabove in connection with the embodiment referring to the drawings, the compensation of the stresses due to the potassium ions and to the lithium ions is insured when the temperature decreases between 1100° C. to the melting point of the bath, provided the time of contact does not exceed 20 minutes.

Because of the fact that the glass strip has been cooled to about 560° C., precautions must be taken when the strip is removed from the base 5. Therefore the upper face 17 of the median portion of the vertical front wall 18 of tank 6 is slightly below the upper face of base 5. On the other hand, the end portions 19 of this front wall 18 situated on the two sides of the glass strip 9 have their upper face 20 above the upper level of the salt bath 10. Between these end portions 19 and the glass strip 9, there remain gaps 21 through which a part of the salt bath 10 can escape. The salt bath passing through these gaps is collected into a refractory channel 22 provided with an evacuation duct 23 connected to a pump 24. The molten salt bath is recycled by this pump into the spaces between the side faces of the glass strip 9 and the side faces of the tank 6. Preferably the molten mixture is introduced near the front wall 18 of the tank 6 in order to prevent disturbance of the thermal gradient along the tank and to decrease the reheating of the molten mixture. In order to avoid the solidification of the bath, heating means such as electrical resistances 25 and 26 are provided respectively in the front wall 18 and in the bottom of the refractory channel 22.

The exact time of contact of the glass strip 9 with the film of the bath 10 interposed between the strip and the solid metal base 5 varies from one application to another as it depends upon the speed of production of the strip, this speed varying with the composition of the glass, with the thickness of the strip desired, with the intensity of the cooling and with the length of the bath 10. It is sufficient to obtain no deformation of the strip on said bath if the time of contact does not exceed 20 minutes.

A second application of the bath according to the invention, is in the enameling of a glass strip of the same composition as in the preceding example.

A glass plate is coated on one face with a dispersion of an enameling composition which has been prepared as follows: 800 grams of $Ag_2S$ and 1200 grams of CuS are mixed with 2.5 litres of water. The suspension thus obtained is treated for 12 hours in a ball mill. After the mill has been emptied it is washed with 5 litres of water which are then added to the ground suspension. The resulting mixture is evaporated to dryness. The dry powder obtained is then dispersed into 1.3 litres of water and the dispersion is applied on the glass to be enameled at the rate of 130 cubic centimeters per square meter.

The thus coated glass plate is heated in an electric furnace to a temperature of 565° C. When this temperature is reached the glass is introduced on a molten salt bath at the same temperature and having the following weight composition: $BaCl_2$, 50%; NaCl, 25%; LiCl, 10%; KCl, 15%.

The glass plate is maintained at this temperature on the salt bath for fifteen minutes whereafter it is removed from the bath and cooled. The color of the enameled glass is dark amber.

The composition of the bath used in this case is also such that the compensation of the stresses due to the potassium ions and to the lithium ions is obtained when the treatment temperature is comprised between 1100° C. and the melting point of the bath provided the duration of the contact of the glass with the bath does not exceed twenty minutes. By the fact that the glass to be enameled has been in contact with the bath only for fifteen minutes at a temperature a little above the melting point of the bath, the enameled glass is not distorted by the ions exchange with this bath. If, unintentionally, the bath is heated during a part of the firing of the enamel at a temperature a little above the annealing point of the glass, i.e., above 570° C., the glass plate still remains undistorted on its perfectly plane support, by reason of the compensation of stresses due to the passage of potassium ions and of lithium ions into the glass.

From the above, it will be evident that the bath according to the invention is adapted for supporting a glass strip, both at temperatures above and below the annealing point thereof for various treatments, and yet produce a glass product which is substantially free of residual stress. It is significant to note that two effects are counterbalanced, namely the volume effect due to the size of the displaced ions, and the change in the coefficient of expansion which is produced by the displacement of said ions.

What is claimed is:

1. A salt bath for supporting a glass ribbon in the plastic state, said bath comprising chlorides of metals which diffuse into the glass and chlorides of metals which do not substantially diffuse into the glass, the chlorides of metals which diffuse into the glass including both on the one hand chlorides of metals which increase the coefficient of expansion of the glass when they diffuse into the glass with substitution, and on the other hand chlorides of metals which reduce the coefficient of expansion of the glass when they diffuse into the glass with substitution, said chlorides of metals which diffuse into the glass being respectively present in said bath, in a proportion such that diffusion into the glass of the cations of such diffusing metals and the substitution of such cations for constituent metal cations of the glass are accompanied by little change in the glass volume and in the coefficient of expansion of the glass.

2. A protective salt bath as claimed in claim 1 wherein said ribbon is soda glass and said bath contains sodium chloride, said chlorides of metals diffusing into the glass respectively being chlorides of potassium, lithium and sodium and said chlorides of metals which do not substantially diffuse into the glass being chloride of barium.

3. A salt bath as claimed in claim 1, wherein said bath is constituted by a mixture of between 13–18% potassium chloride, 7–13% lithium chloride, 20–30% sodium chloride and 40–60% barium chloride.

4. A salt bath as claimed in claim 3, wherein said bath is constituted by a mixture of 50% barium chloride, 25% sodium chloride, 10% lithium chloride, and 15% potassium chloride.

5. In a method in which a glass ribbon is floated on a bath, an improvement comprising forming the bath of chlorides of metals which diffuse into the glass and of chlorides of metals which do not diffuse into a glass, said glass ribbon normally undergoing ionic exchange of a metal thereof with metals of the bath which diffuse into the glass whereby residual stress effects in the glass are produced, the bath including chlorides of these last metals having opposed effects on the volume and on the coefficient of expansion of the glass, the latter chlorides being present in specific quantities to counterbalance the residual stress effects caused by the ionic exchange of the metals of said chlorides with the metal of the glass.

6. In a method as claimed in claim 5 wherein the bath is at a temperature above the annealing point of the glass.

7. In a method as claimed in claim 5 wherein the bath is at a temperature below the annealing point of the glass.

8. In a method as claimed in claim 5 wherein the bath is molten and is gradually allowed to cool along its length to provide a temperature gradient for the glass ribbon which passes thereon.

9. In a method as claimed in claim 5 wherein said glass ribbon is soda glass and the bath contains 20 to 30% sodium chlorides, 40 to 60% barium chloride, 13 to 18% potassium chloride and 7 to 13% lithium chloride.

10. In a method as claimed in claim 9 wherein the glass ribbon remains in contact with the bath for less than twenty minutes.

References Cited by the Examiner

UNITED STATES PATENTS

| | | | |
|---|---|---|---|
| 2,754,559 | 2/1955 | Fromson | 65—182 |
| 3,151,366 | 10/1964 | Fromson | 65—182 |
| 3,260,585 | 7/1966 | Javaux | 65—65 |

OTHER REFERENCES

Kistler: "Stresses in Glass Produced by Nonuniform Exchange of Monovalent Ions," Jour. of Amer. Cer. Soc., vol. 45, No. 2, February 1962, pp. 59–68.

S. LEON BASHORE, *Acting Primary Examiner.*

G. R. MYERS, *Assistant Examiner.*